United States Patent
Agon

(10) Patent No.: US 9,661,950 B2
(45) Date of Patent: May 30, 2017

(54) ERGONOMIC HANDLE WITH USER-INTERFACE

(75) Inventor: Fabien Ludovic Agon, Le Bouveret (CH)

(73) Assignee: Nestec S.A., Vevey (CH)

( * ) Notice: Subject to any disclaimer, the term of this patent is extended or adjusted under 35 U.S.C. 154(b) by 230 days.

(21) Appl. No.: 13/821,135

(22) PCT Filed: Sep. 6, 2011

(86) PCT No.: PCT/EP2011/065342
§ 371 (c)(1),
(2), (4) Date: Mar. 6, 2013

(87) PCT Pub. No.: WO2012/032019
PCT Pub. Date: Mar. 15, 2012

(65) Prior Publication Data
US 2013/0160654 A1    Jun. 27, 2013

(30) Foreign Application Priority Data

Sep. 7, 2010    (EP) ..................................... 10175544

(51) Int. Cl.
*A47J 31/36*    (2006.01)
*A47J 31/44*    (2006.01)

(52) U.S. Cl.
CPC ....... *A47J 31/3676* (2013.01); *A47J 31/3633* (2013.01); *A47J 31/4403* (2013.01)

(58) Field of Classification Search
USPC ........................................................ 99/295
See application file for complete search history.

(56) References Cited

U.S. PATENT DOCUMENTS

| 3,477,263 | A * | 11/1969 | Dokos ....................... B67B 7/38 |
| | | | 72/324 |
| 6,240,830 | B1 * | 6/2001 | Goldston ......................... 99/279 |
| 6,698,332 | B2 * | 3/2004 | Kollep ................ A47J 31/4407 |
| | | | 99/289 R |
| 7,318,373 | B2 * | 1/2008 | Blanc et al. .................. 99/302 P |
| 7,320,274 | B2 * | 1/2008 | Castellani ....................... 99/295 |
| 7,513,192 | B2 * | 4/2009 | Sullivan et al. ............. 99/289 R |
| 2005/0126400 | A1 * | 6/2005 | Bragg ................. A47J 31/0673 |
| | | | 99/279 |

(Continued)

FOREIGN PATENT DOCUMENTS

| DE | 2945360 | 5/1980 |
| EP | 1829469 A1 * | 9/2007 .............. A47J 31/40 |
| WO | 2007016977 | 2/2007 |

OTHER PUBLICATIONS

PCT International Search Report for Application No. PCT/EP2011/065342 with a Mailing Date of Oct. 5, 2011; 2 pages.

(Continued)

*Primary Examiner* — Quang D Thanh
*Assistant Examiner* — Renee Larose
(74) *Attorney, Agent, or Firm* — K&L Gates LLP

(57) ABSTRACT

A machine (1) for preparing a beverage comprises: a handle (10, 12) having a drive portion (12) arranged to be contacted and driven by a human hand to move the handle into a beverage preparation position; and a user-interface (20a) for initiating beverage preparation. This drive portion comprises this user-interface.

16 Claims, 2 Drawing Sheets

(56) References Cited

U.S. PATENT DOCUMENTS

| | | | |
|---|---|---|---|
| 2006/0102008 A1* | 5/2006 | Lin | A47J 31/0684 99/279 |
| 2007/0051247 A1 | 3/2007 | Felty | |
| 2008/0000357 A1* | 1/2008 | Yang | A47J 31/3685 99/279 |
| 2008/0148957 A1* | 6/2008 | Zanetti | 99/295 |
| 2010/0263543 A1* | 10/2010 | Krauchi et al. | 99/280 |
| 2010/0263550 A1* | 10/2010 | Cahen et al. | 99/323.1 |
| 2010/0275785 A1* | 11/2010 | Weissman | A47J 31/20 99/287 |
| 2010/0288132 A1* | 11/2010 | Gavillet | A47J 31/3628 99/295 |
| 2010/0288135 A1* | 11/2010 | Reyhanloo | 99/323.3 |
| 2010/0300301 A1* | 12/2010 | Cahen et al. | 99/323.1 |

OTHER PUBLICATIONS

Written Opinion of the PCT International Search Report for Application No. PCT/EP2011/065342 with a Mailing Date of Oct. 5, 2011; 3 pages.

\* cited by examiner

ERGONOMIC HANDLE WITH USER-INTERFACE

CROSS REFERENCE TO RELATED APPLICATIONS

The present application is a National Stage of International Application No. PCT/EP2011/065342, filed on Sep. 6, 2011, which claims priority to European Patent Application No. 10175544.5, filed Sep. 7, 2010, the entire contents of which are being incorporated herein by reference.

FIELD OF THE INVENTION

The field of the invention pertains to machines for preparing beverages from a liquid circulating through a flavouring ingredient. In particular, the field pertains to the ergonomic handling of such machines by users in order to prepare a beverage.

For the purpose of the present description, a "beverage" is meant to include any liquid food, such as tea, coffee, hot or cold chocolate, milk, soup, baby food, hot water, etc. . . . A "capsule" is meant to include any pre-portioned beverage ingredient within an enclosing packaging of any material, in particular an airtight packaging, e.g. plastic, aluminium, recyclable and/or biodegradable packagings, and of any shape and structure, including soft pods or rigid cartridges containing the ingredient.

BACKGROUND ART

Certain beverage preparation machines use capsules containing ingredients to be extracted or to be dissolved; for other machines, the ingredients are stored and dosed automatically in the machine or else are added at the time of preparation of the drink.

Most coffee machines possess filling means that include a pump for liquid, usually water, which pumps the liquid from a source of water that is cold or indeed heated through heating means, such as a heating resistor, a thermoblock or the like.

Such machine typically have a brewing unit for holding and extraction the beverage ingredient. To introduce the ingredient into the brewing unit and then remove the ingredient upon use, the brewing unit has a closure mechanism that may be driven by a handle that is operable by a user. Various configurations for manipulating the machine have been disclosed in the art.

EP 1 208 782 discloses a coffee machine having a main body including a brewing unit for extracting coffee capsules. The brewing unit is opened and closed with the aid of a handle that can be turned over the main body by an angle of about a 180 deg. from behind to the front of the main body. The handle has a pair of generally L-shaped levers connected at one end by a hand-drivable transverse rod and pivotally mounted at the opposite end to the opening and closing mechanism of the brewing unit. The pivotable L-shaped levers drive a movable part of the brewing unit via a pair of intermediate levers connected at a first end to this movable brewing unit part and at a second end to the corner of the L-shaped levers. US 2008/0006159 discloses a brewing unit that has a horizontally movable drawer for introducing an ingredient pouch and a vertically movable top part with a piercing mechanism for opening the pouch. These elements are driven by a generally U-shaped movable handle that can be pivoted from an upright open position down to a generally horizontal closed position. U.S. Pat. No. 7,165,488, WO 2007/111884 and EP 1 829 469 disclose a beverage machine having a brewing unit that can be opened and closed manually by a handle system that is linked to a movable top part of the brewing unit and indirectly to a top front part of the main body.

More recently, efforts have been specifically devoted to the ease of operation of a beverage preparation machine for a user and ergonomic configuration of such machines, as illustrated in the following documents.

EP 1 878 368 discloses a beverage machine having a functional block that is rotatably mounted on a support base. The functional block can be designed to be removable from the support base. EP 1 864 598 discloses an autonomous beverage machine that can be mounted onto a docking station. The beverage machine is arranged to be operable whether connected to the docking station or disconnected therefrom. WO 2009/074553 and WO 2010/015427 disclose beverage preparation machines that are configured so that they can be lifted single-handed by a user.

For allowing the user to control machine operation various systems have been disclosed in the art, for instance as mentioned in the following references: AT 410 377, CH 682 798, DE 29 45 360, DE 44 29 353, DE 202 00 419, DE 20 2006 019 039, DE 2007 008 590, EP 1 448 084, EP 1 676 509, EP 08155851.2, FR 2 624 844, GB 397 510, U.S. Pat. No. 4,377,049, U.S. Pat. No. 4,458,735, U.S. Pat. No. 4,554,419, U.S. Pat. No. 4,767,632, U.S. Pat. No. 4,954,697, U.S. Pat. No. 5,312,020, U.S. Pat. No. 5,335,705, U.S. Pat. No. 5,372,061, U.S. Pat. No. 5,375,508, U.S. Pat. No. 5,731,981, U.S. Pat. No. 5,645,230, U.S. Pat. No. 5,836,236, U.S. Pat. No. 5,959,869, U.S. Pat. No. 6,182,555, U.S. Pat. No. 6,354,341, U.S. Pat. No. 6,759,072, US2007/0051247, US 2007/0157820, WO 97/25634, WO99/50172, WO 2004/030435, WO 2004/030438, WO 2006/063645, WO 2006/090183, WO 2007/003062, WO 2007/003990, WO 2008/104751, WO 2008/138710, WO 2008/138820, WO 2009/135821 and WO 2010/003932.

US2007/0051247 discloses a beverage preparation machine having a rear water reservoir covered with a hinged lid that bears a user-interface. A brew basket or tray for holding coffee has a handle for swinging the basket or tray inwards and outwards of the machine to add or remove coffee, e.g. within a single-use plastic basket.

DE 29 45 360 discloses a beverage preparation machine having a drawer containing the machine's fluid circuit and control unit and bearing a user-interface, the drawer being slidable into and out from a front part of the machine. A filter holder with a handle is mounted by a bayonet connector to the underside of the drawer.

DE 20 2006 019 039, AT 410 377, U.S. Pat. No. 4,377,049, U.S. Pat. No. 4,554,419, U.S. Pat. No. 4,954,697, U.S. Pat. No. 5,685,435, U.S. Pat. No. 6,759,072, U.S. Pat. No. 6,182,555, WO 2004/030438, WO 2006/090183, WO 2007/003990 WO 2008/138710 and WO 2010/003932 disclose beverage dispensing machines with a generally upright front face having a lower open cavity for receiving a receptacle to be filled via a beverage outlet in the cavity and, on an upper part of the front face, above the opening of this cavity, a generally vertical upper screen, touch screen and/or touch pad arranged as a user-interface. FR 2 624 844 discloses a beverage dispenser having a front face with an open cavity for filling a receptacle and a micro-computer with a keyboard and a monitor housed in the machine's front face next to the cavity opening.

More advanced user-interface systems may include user-movable laser pointers for setting a level of fill directly on a user-cup, as taught in WO 2006/063645, or a sensor for acquiring the position of a finger or a user-operated object pointing onto a desired level of fill on a cup, as disclosed in WO 2009/135821, and filling automatically the cup to such a level.

However, there is still a need to further improve the ergonomics of a coffee machine arranged so that its operation by a user is facilitate, in particular accelerated.

SUMMARY OF THE INVENTION

The invention thus relates to a machine for preparing a beverage. The machine includes: a handle having a drive portion arranged to be contacted and driven by a human hand to move the handle into a beverage preparation position; and a user-interface for initiating beverage preparation. In accordance with the invention the drive portion comprises the user-interface.

In other words, when a user using his/her hand moves the handle into a position for preparing a beverage, the user does not need to move the hand significantly or look to a different location on the beverage machine to initiate beverage preparation. The user's hand used for moving the handle and positioned on the handle can be used at the same location on the machine to initiate the beverage preparation by operating the interface located on the handle upon moving the handle into the beverage preparation position. User-operation of the machine is facilitate and the ergonomics of the machine is improved.

Normally, the handle and the user-interface are arranged so that the user-interface is operable by the user's hand while this hand is still in contact with the drive portion of the handle upon driving the handle into the beverage preparation position or when the user's hand is immediately adjacent to the handle.

In other words, the user does not have to displace his or her hand to a different location on the machine or use another hand to start the beverage making process after the handle has been moved into the beverage preparation position. Hence, the manual operation of the machine is simplified and accelerated by minimising the user's operational effort.

The drive portion can be arranged to be pushed and/or pulled by a human hand for driving the handle, the user-interface being operable by the human hand while the hand is still in a pushing and/or pulling position against the drive portion of the handle upon driving the handle into the beverage preparation position. The handle may be pushed by the user's fingertips and/or pulled by gripping the handle.

The drive portion can be arranged to be seized by the human hand for driving the handle. The user-interface may be configured to be operable by the human hand while the hand is still seizing the drive portion of the handle upon driving the handle into the beverage preparation position.

Advantageously, the drive portion forms a part of least counter-force of the handle against the human hand while driving the handle. Hence, in this configuration, the user will drive the handle to the beverage preparation position by actuating the drive portion of the handle that generates least mechanical resistance during the movement.

The handle has thus at least two positions: the beverage preparation position; and a position away from the position for preparing a beverage. For instance, the handle is pivotally movable into and away from the beverage preparation position.

For instance, the machine includes a beverage preparation module, optionally comprising a brewing unit, for holding a flavouring ingredient, in particular a pre-portioned ingredient such as an ingredient supplied to such module within a capsule. The module may be arranged for circulating a liquid, e.g. water, through the ingredient to form a beverage.

Such beverage preparation typically includes the mixing of a plurality of beverage ingredients, e.g. water and milk powder, and/or the infusion of a beverage ingredient, such as an infusion of ground coffee or tea with water. For instance, a predetermined amount of beverage is formed and dispensed on user-request, which corresponds to a serving. The volume of such a serving may be in the range of 25 to 200 ml, e.g. the volume for filling a cup or mug, depending on the type of beverage.

Formed and dispensed coffee beverages may be selected from ristrettos, espressos, lungos, cappuccinos, café latte, americano coffees, teas, etc. . . . For example, a coffee machine may be configured for dispensing espressos, e.g. an adjustable volume of 20 to 60 ml per serving, and/or for dispensing lungos, e.g. a volume in the range of 70 to 150 ml per serving.

Tea may be dispensed in larger amounts than coffee, e.g. typically between 100 and 300 ml per serving. Chocolate and other beverages, e.g. soup, can be dispensed in the same amount.

The handle may be movable between an open position for loading the flavouring ingredient into the module and/or evacuating this ingredient from the module, and a beverage preparation position for circulating the liquid through this ingredient.

The user-interface is typically configured, in particular connected to a control unit of the machine, for initiating circulation of this liquid through the flavouring ingredient in the beverage preparation module.

In particular, the handle has a drive portion arranged to be contacted and driven by a human hand to move the handle between the open position and the beverage preparation position. Typically, the handle is movable from the open position to the beverage preparation position.

For instance, the machine is a coffee, tea, chocolate or soup machine. The machine may be arranged for preparing within a brewing unit a beverage by passing hot or cold water or another liquid through a capsule containing a flavouring ingredient of the beverage to be prepared, such as ground coffee or tea or chocolate or cacao or milk powder.

The user-interface can be arranged in the drive portion, e.g. the drive portion bears the user-interface, so that upon moving the handle into the beverage preparation position, the human hand contacting the drive portion is already in position to operate the user-interface for initiating beverage preparation.

The user-interface may include at least one user-selector selected from push-buttons, turn-buttons, toggle-switches, slide buttons, touch-buttons, touch pads and touch screens. The user-interface may comprise a plurality of selectors for selecting different drinks, in particular drinks of different sizes and/or different types, such as espresso, regular coffee and/or lungos, extra-long coffee and milk coffee.

The user-interface may comprises a plurality of user-selectors for initiating different beverage preparation programs, in particular different programs corresponding to different beverage preparation volumes. For instance, the machine is a coffee machine and the user-selectors allow a user to choose between espresso, lungo and Americana coffee. When the coffee machine includes a milk module, the user-selectors may extend to allowing a user to select milk coffee, such as cappuccino, café latte, etc.

For instance, the user-interface comprises one or more touch-sensitive and/or proximity-sensitive user-selectors, such as a touch button, capacitive button and/or a piezo-electric button. Any type of user-selector may be used that is operable by a human hand including push-buttons and touch screens.

The user-interface may be deactivated when the handle is out of the beverage preparation position. With such a configuration, an inadvertent initiation of a beverage preparation, e.g. circulating a liquid, may be prevented when the machine is not ready, i.e. when the handle is not in the beverage preparation position.

The user-interface may be associated with a light emission means, such as one or more LEDs. Such means may be used to signal a condition of the machine, in particular the readiness to initiate a beverage preparation. In combination with the previous deactivation feature, the light status of the user-interface may be changed when the handle passes from the position to prepare a beverage to a different position and/or vice versa.

The drive portion may extend longitudinally. Optionally, the drive portion comprises the user-interface in a longitudinal arrangement, in particular a plurality of user-selectors longitudinally arranged side-by-side and/or spaced apart along the drive portion. Hence, the user-interface may extend along the drive portion, in particular one or more user-selectors forming the user-interface may be aligned longitudinally along the drive portion.

In one embodiment, the handle comprises a pivotally mounted lever, such as a single-arm lever the drive portion being formed by an end of the lever. The lever may be generally shaped as a rod or bar or the like, in particular generally straight. Examples of such handle shapes are disclosed in WO 2005/004683 and WO 2007/135136.

In another embodiment, the drive portion can be connected to at least one pivotally mounted lever at an angle thereto such as perpendicularly thereto, in particular connected inbetween a pair of pivotally mounted levers. Examples of such a handle shape is disclosed in WO 2009/043630 and WO 2010/015427. The machine may include a housing, the drive portion being movable over the housing, in particular over a top part of the housing and/or over an edge of the housing Hence, the handle can be pivotally movable, in particular pivotally movable over a top part of the machine. The handle can be generally U-shaped, the drive portion forming in particular a middle part of the generally U-shaped handle. The handle can have a pair of levers and the drive portion between the levers, in particular a pair of levers having first end portions that are pivotally mounted and second end portions that are joined via the drive portion. The handle may be a single-arm lever, in particular a lever having a first end portion that is pivotally mounted and a second end portion that forms the drive portion.

In a particular embodiment of the invention, the machine includes a brewing unit, the handle being arranged to move the brewing unit: from an open configuration for introducing and/or evacuating a beverage ingredient; into a beverage preparation configuration for processing said ingredient; and/or vice-versa. Examples of such machines with a brewing unit operated by a handle are disclosed in the above-mentioned WO 2005/004683, WO 2007/135136, WO 2009/043630 and WO 2010/015427, the contents of which are hereby incorporated by way of reference.

Once the brewing unit is closed by actuating the handle and contains the ingredient, the user may operate the user-interface on the handle as discussed above without having to go to a different location to request the processing of the ingredient. Providing the user-interface on the handle moving the brewing unit offers the advantage that interface is connected to the mechanical part (handle) that is normally operated by a user each time a beverage serving is requested and operated last by a user before processing of the beverage is initiate by energizing a liquid driver and optionally a thermal conditioner. Other parts may of course be movable in the beverage preparation machine, such as a water reservoir that must be from time to time refilled or a side panel giving access to the inside of the beverage preparation machine. However, these parts do not require handling by a user each time a beverage preparation is requested. On the contrary, water reservoir may typically contain a volume of water for preparing a plurality, e.g. more than 5, such as 10 to 20 beverage servings. Machine panels are exceptionally removed, e.g. for maintenance and/or repair operations. Hence, water reservoirs and side panels are usually not manipulated by a user each time a beverage serving is desired.

The brewing unit may form a seat for receiving a capsule containing the beverage ingredient such as a flavouring ingredient. Typically, the capsule is a single use capsule, e.g. that is used for dispensing a single beverage serving. The brewing unit in the open configuration can delimit a passage for introducing and/or evacuating the beverage ingredient, the passage being closed in the beverage preparation configuration.

The passage may be configured for an introduction by gravity of the flavouring ingredient, in particular within a capsule, into the beverage preparation module, in particular into the brewing unit, the drive portion being located generally above and/or adjacent the passage when the handle is in the open position. Hence, the handle in its open position is located closely to the user's hand that inserts the ingredient into the machine's passage so that minimal movement of the hand is required from the insertion of the ingredient to manually actuating the handle.

The brewing unit may comprise a first part that is movable relative to a second part by the handle between the open configuration and the beverage preparation configuration.

Hence, the brewing unit may be moved by the handle between: the open configuration, namely a transfer configuration, in which the flavouring ingredient is introduced into the brewing unit and/or evacuated therefrom; and the beverage preparation configuration, namely a circulation configuration, in which the liquid is circulated through the flavouring ingredient to prepare the beverage. The circulation and transfer configurations of the brewing unit typically correspond to the handle's beverage preparation position and open position, respectively.

Typically, the machine includes one or more of a pump, heater, drip tray, ingredient collector, liquid tank and fluid connection system for providing a fluid connection between the liquid tank and the brewing unit, etc. . . . The configuration of a fluid circuit between a source of liquid, e.g. a reservoir, and a brewing unit, i.e. a suitable beverage preparation module, is for example disclosed in greater details in WO 2009/074550.

Furthermore, the brewing unit may include a hydraulic sealing arrangement that is activated by operating the user-interface. Such a hydraulic sealing arrangement is disclosed in greater details in EP 09172187.8, the content of which is hereby incorporated by way of reference.

BRIEF DESCRIPTION OF THE DRAWINGS

The invention will now be described with reference to the schematic drawings, wherein.

DETAILED DESCRIPTION

Figure 1:
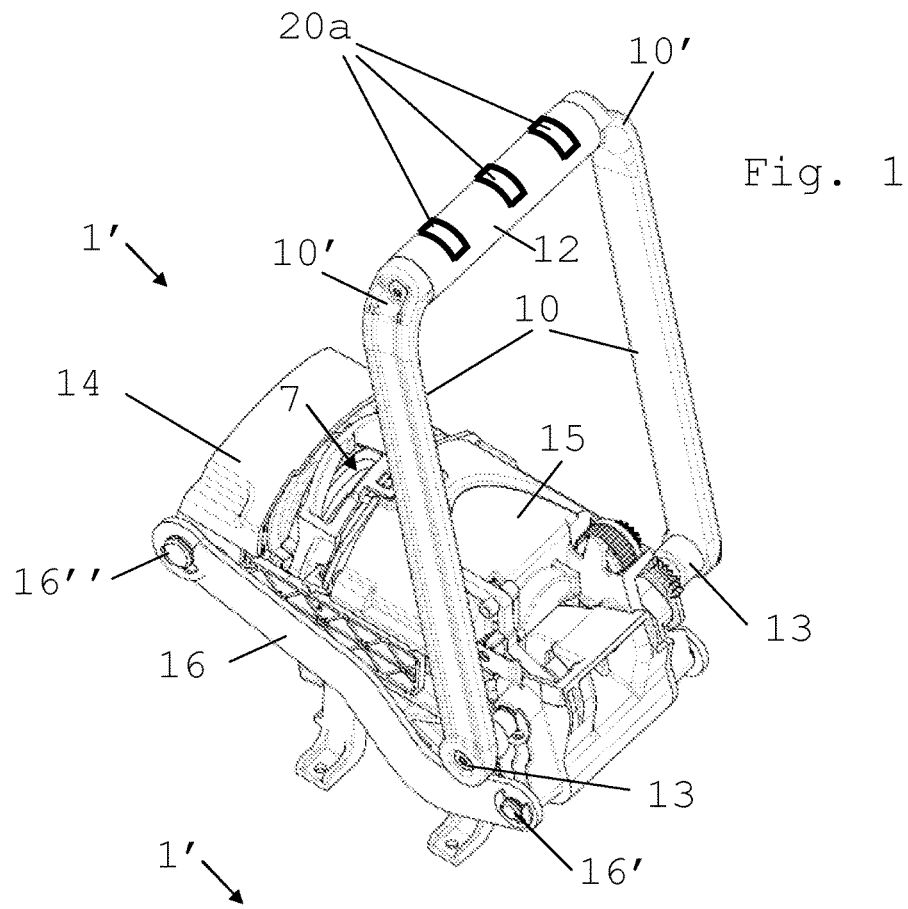
FIGS. 1 and 2 illustrate an assembly including a brewing unit with an opening and closing handle that bears a user-interface for a machine in accordance with the invention.
Figure 2:
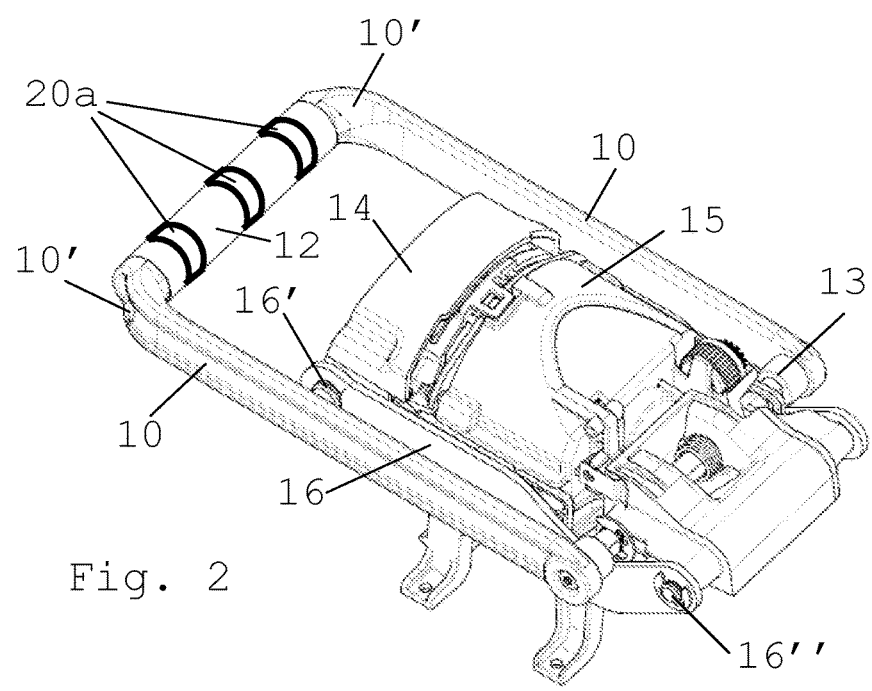
Figure 3:
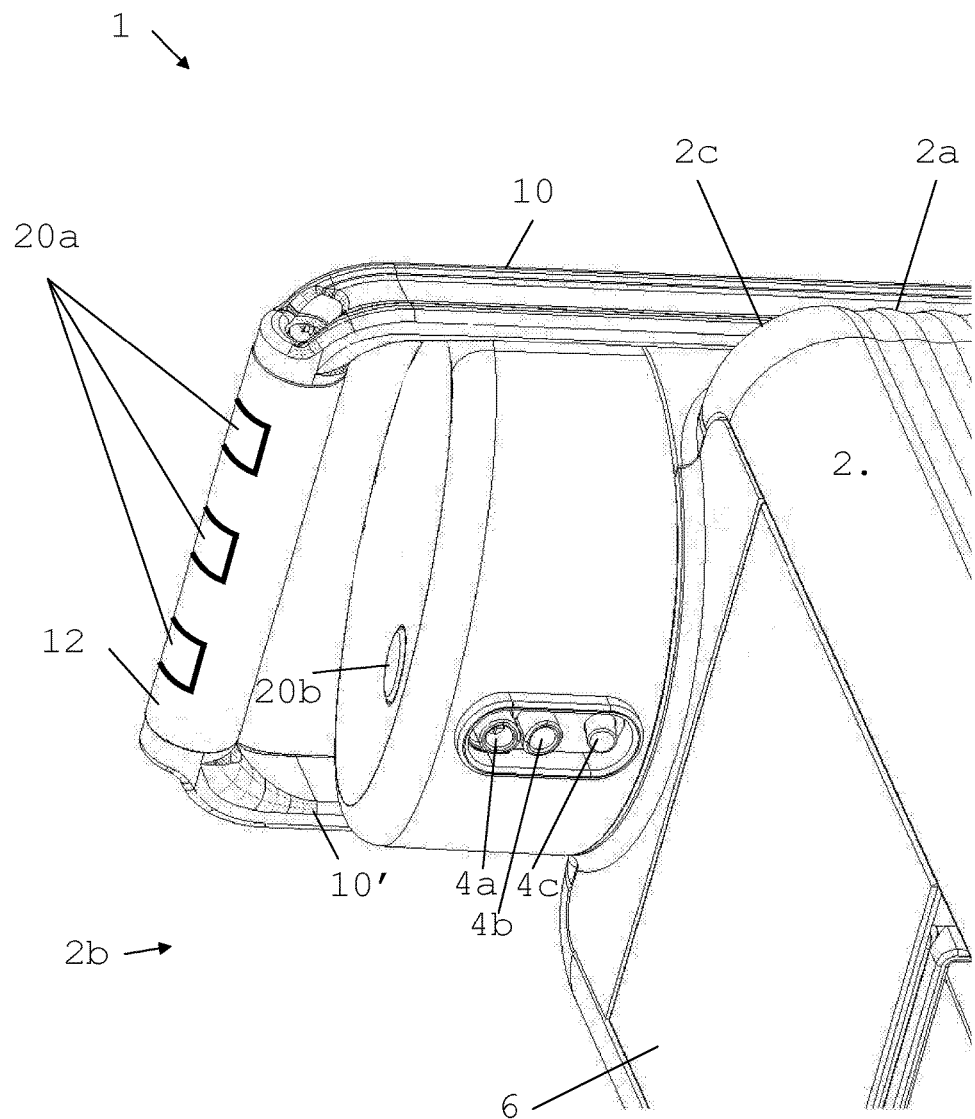
FIG. 3 shows a perspective view of a front part of a beverage preparation machine that houses the assembly shown in FIGS. 1 and 2.

FIGS. 1 to 3 illustrate an embodiment of part of a beverage preparation machine 1 according to the invention.

Machine 1 has an internal beverage preparation module covered by a housing 2. The beverage preparation module is arranged for holding a flavouring ingredient, in particular a pre-portioned ingredient such as an ingredient supplied to such module within a capsule, and circulating a liquid therethrough to form the beverage.

The liquid, e.g. water, may be stored and supplied to the beverage preparation module from a tank. The beverage, upon formation, can be dispensed via an outlet 4a,4b,4c to a dispensing area, in particular a support for holding a user cup or mug, e.g. as disclosed in EP 1 867 260 and in WO 2009/074557, the contents of which are hereby incorporated by way of reference. The dispensing area may include a first cup support that is movable away from under outlet 4a,4b,4c so as to give access to a lower second cup support for larger cups, e.g. for dispensing lungos or extra-large beverages. The lower cup support may be connected to a base of machine 1.

Adjacent to the beverage preparation module, machine 1 may have a collector 6 for used flavouring ingredient, e.g. ground coffee or tea upon brewing, for instance contained within capsules. Collector 6 may be positioned underneath the beverage preparation module, in particular below a brewing unit 1', to collect upon beverage preparation the used flavouring ingredient evacuated to collector 6, e.g. by gravity. Suitable collectors are for example disclosed in WO 2009/074559 and in WO 2009/135869, which are hereby incorporated by way of reference.

The beverage preparation module typically includes one or more of the following components:

a) the ingredient holder, such as a brewing unit 1', for receiving the flavouring ingredient of this beverage, in particular a pre-portioned ingredient supplied within a capsule, and for guiding an incoming flow of liquid, such as water, through this ingredient to beverage outlet 4a, 4b, 4c;
b) an in-line heater, such as a thermoblock, for heating this flow of liquid to be supplied to the ingredient holder;
c) a pump for pumping this liquid through the in-line heater;
d) one or more fluid connecting members for guiding this liquid from a source of liquid, such as a tank of liquid, to a beverage outlet 4a,4b,4c;
e) an electric control unit, in particular comprising a printed circuit board (PCB), for receiving instructions from a user via the user-interface 20a,20b for controlling the in-line heater and the pump; and
f) one or more electric sensors for sensing at least one operational characteristic selected from characteristics of the ingredient holder, the in-line heater, the pump, the liquid reservoir, ingredient collector 6, a flow of this liquid, a pressure of this liquid and a temperature of this liquid, and for communicating such characteristic(s) to the control unit.

The heater may be a thermoblock or an on demand heater (ODH), for instance an ODH type disclosed in EP 1 253 844, EP 1 380 243 and EP 1 809 151. Examples of suitable brewing units and capsule management are for example disclosed in WO 2005/004683, WO2007/135136 and WO 2009/043630, which are hereby incorporated by way of reference. Suitable beverage preparation modules are for instance disclosed in WO 2009/074550 and WO 2009/130099 which are hereby incorporated by way of reference.

Brewing unit 1' of machine 1 has a front part 14 and a rear part 15. Front and rear parts 14,15 can be moved apart (FIG. 1) to form between them a passage 7 for the insertion of a capsule and may be moved together (FIG. 2) around the inserted capsule for closing passage 7, for forming a brewing chamber around the capsule and for circulating liquid, e.g. water, through the chamber and the capsule therein to form a beverage.

Handle 10,12 is movable between an open position, namely a transfer position, (FIG. 1) in which parts 14,15 are spaced apart to form passage 7 and a beverage preparation position (FIGS. 2 and 3) in which parts 14,15 are urged together around a capsule for circulating liquid through the capsule. The handle has a drive portion 12 arranged to be contacted and driven by a human hand. Drive portion 12 can extend longitudinally between a pair of levers 10 forming therewith generally a u-shape. Hence, drive portion 12 forms a middle part of handle 10,12. Levers 10 are pivotally mounted opposite drive portion 12 about a pivot axis 13 in rear part 15 of brewing unit 1'. Lever 10 extends beyond pivot axis 13 and is connected to an extremity of a traction arm 16 via a pivot joint 16'. An opposite extremity of traction arm 16 is connected via a second pivot joint 16" to front part 14 of brewing unit 1'.

Hence, moving handle 10,12 from the open position (FIG. 1) to the beverage preparation position (FIG. 2) causes front part 14 to be pulled against rear part 15 via traction arm 16. The relative movement of parts 14,15 may be further assisted by a hydraulic system (not shown), in particular for tightly closing the brewing unit, e.g. as explained in EP 09172187.8, the content of which is hereby incorporated by way of reference.

Drive portion 12 forms a part of least counter-force of handle 10,12 against the user's hand while driving the handle.

For convenience, drive portion 12 may have a surface or profile specially adapted for being hand driven, e.g. the surface of drive portion 12 may include a means, such as a surface structure or composition, in particular an anti-skid surface that provides friction against a human hand.

Further details of a brewing unit 1' and extraction module of this kind are disclosed in co-pending application EP 09172187.8 and EP 09177592.4 which are hereby incorporated by way of reference. Examples of handling of a capsule in such a brewing unit via an insertion passage for a flavouring ingredient are disclosed in WO 2007/135135.

Machine 1 has a user-interface 20a for initiating beverage preparation, in particular for starting circulation of liquid through the ingredient in the beverage preparation module. In accordance with the invention, drive portion 12 comprises the user-interface 20a for initiating beverage preparation. As illustrated in FIGS. 1 to 3, user-interface includes a plurality of selectors 20a, e.g. three selectors. Such selectors 20a may be used to allow a user to choose between different beverage preparation programs, e.g. for preparing a large, medium or small beverage such as coffee.

Drive portion 12 extends longitudinally and comprises user-interface 20a in a longitudinal arrangement, in particular a plurality of user-selectors 20a longitudinally arranged side-by-side and spaced apart along drive portion 12. Drive portion 12 is connected to at least one pivotally mounted lever 10 at an end 10' thereof and/or an angle thereto such as perpendicularly thereto. In particular, drive portion 12 can be connected inbetween a pair of pivotally mounted levers 10.

FIG. 3 illustrates a part of machine 1 with its housing 2 and handle 10,12 in the beverage preparation position.

Drive portion 12 is arranged to be pushed, pulled and/or seized by a human hand for driving handle 10,12. User-interface 20a can be operated by such a hand while the hand is still in a pushing, pulling and/or seizure position against drive portion 12 of the handle upon driving the handle into the circulation position.

As illustrated in FIGS. 1 to 3, handle 10,12 is pivotally movable over a top part of machine 1. Moreover, machine 1 has a front face 2b bearing outlets 4a,4b,4c for delivering the beverage into a user-cup or user-mug (not shown) located therebelow.

As illustrated in FIG. 3, user-interface 20a for initiating beverage preparation is located on drive portion 12 and a further user-interface 20b is located on front face 2b. The further user-interface 20b may be a master switch or a selector for dispensing (unflavoured) hot water or for dispensing milk.

User-interface 20a for initiating beverage preparation may include one or more touch-sensitive and/or proximity-sensitive user-selectors, such as a touch button, capacitive button and/or a piezoelectric button.

Advantageously, user-interface 20a for initiate beverage preparation is deactivated when handle 10,12 is out of the beverage preparation position, e.g. in the open position as illustrated in FIG. 1. Hence, a user may move handle 10,12 into the beverage preparation position (FIGS. 2 and 3) while having his/her hand in contact with one of selectors 20a which corresponds to the desired type of beverage. Once handle 10,12 reaches the beverage preparation position, user-selectors 20a are activated and the presence of the hand on said one of selectors 20a is detected so that initiation of the desired beverage preparation process occurs as soon as handle 10,12 reaches the beverage preparation position without any further operation by the user.

Preferably, selectors 20a are associated with a light emission means, such as one or more LEDs. Hence, when selectors 20a are activated or selectable by a user, the light emission means are activated or deactivated correspondingly.

For instance, buttons 20a are arranged for selection of three different dispensing volumes, e.g. espresso coffee, lungo coffee or American coffee, and the lower button 20b may be arranged for selecting optional milk addition into the selected coffee. For example, machine 1 is arranged to dispense coffee via outlet 4a, hot water via outlet 4b for mixing with coffee to prepare Americano coffee, and milk via outlet 4c for incorporation into any coffee or for dispensing as such into a cup or mug. A fluid circuit suitable for preparing Americana coffee or extra-long coffee is disclosed in EP 10152556.6, the content of which is hereby incorporated by way of reference.

In the open position of handle 10,12 (FIG. 1), a user may introduce with his/her hand a flavouring ingredient capsule (not shown) into passage 7 down and along which the capsule is guided by gravity inbetween parts 14,15, and then use the same hand to seize the adjacent drive portion 12 of handle 10,12. By pulling down drive portion 12 over the top, edge and front faces 2a,2b,2c of machine 1, handle 10,12 and brewing unit 1' with the introduced capsule are brought from the open position into the beverage preparation position (FIGS. 2 and 3) in which the capsule is enclosed and secured ready for the circulation of liquid therethrough.

By driving handle 10,12 with a user's hand into the beverage preparation position, drive portion 12 bearing user-interface 20a and driven by the user's actuating hand is brought in front of user-interface 20b. With his or her hand still on drive portion 12 a user may then operate user-interface 20a,20b. Hence, the user does not have to move his/her hand away from drive portion 12 or involve his/her second hand to initiate beverage dispensing via outlets 4a,4b,4c. Thus user-movements for dispensing a beverage are reduced.

The beverage machine of the invention is particularly simple and is configured, in a simple manner, to be easily and safely operated single-handed by a user with few movements.

The invention claimed is:

1. A machine for preparing a beverage, the machine comprising:
   a handle having a drive portion comprising a bar member, the bar member (i) bearing a user-interface for initiating beverage preparation and (ii) arranged to be contacted and driven by a human hand to move the handle into a beverage preparation position; and
   a brewing unit, the handle being arranged to move the brewing unit into the beverage preparation configuration for processing a beverage ingredient.

2. The machine of claim 1, wherein the user-interface is arranged in the drive portion so that upon moving the handle into the beverage preparation position, the human hand contacting the bar member of the drive portion is in a position to operate the user-interface for initiating beverage preparation.

3. The machine of claim 1, wherein the user-interface comprises a plurality of user-selectors for initiating different beverage preparation programs.

4. The machine of claim 1, wherein the user-interface comprises a touch-sensitive and/or proximity-sensitive user-selectors.

5. The machine of claim 1, wherein the user-interface is associated with a light emission member.

6. The machine of claim 1, wherein the drive portion extends longitudinally.

7. The machine of claim 6, wherein the handle comprises a pivotally mounted lever, the drive portion being formed by an end of the lever.

8. The machine of claim 6, wherein the drive portion is connected to at least one pivotally mounted lever at an angle thereto.

9. The machine of claim 6, comprising a housing, the drive portion being movable over the housing.

10. The machine of claim 1, wherein the brewing unit forms a seat for receiving a capsule containing the beverage ingredient.

11. The machine of claim 1, wherein the brewing unit in an open configuration defines a passage for introducing and/or evacuating the beverage ingredient, the passage being closed in the beverage preparation configuration.

12. The machine of claim 1, wherein the brewing unit comprises a first part that is movable relative to a second part by the handle between an open configuration and the beverage preparation configuration.

13. The machine of claim 1, wherein the brewing unit comprises a hydraulic sealing arrangement that is activated by operating the user-interface.

14. The machine of claim 1, wherein the beverage preparation of the handle defines a lateral axis, and the handle is arranged to move the brewing unit parallel to the lateral axis.

15. The machine of claim 1, wherein the user-interface is deactivated when the handle is out of the beverage preparation position.

16. The machine of claim 1, wherein the handle is u-shaped, and the bar member forms a middle part of the u-shaped handle.

\* \* \* \* \*